US011952896B2

(12) United States Patent
Bao et al.

(10) Patent No.: US 11,952,896 B2
(45) Date of Patent: Apr. 9, 2024

(54) ROTARY TOOL WITH THERMALLY STABLE DIAMOND

(71) Applicant: Schlumberger Technology Corporation, Sugar Land, TX (US)

(72) Inventors: Yahua Bao, Provo, UT (US); J. Daniel Belnap, Provo, UT (US); Francis E. Leany, Provo, UT (US); Ronald B. Crockett, Mt. Pleasant, UT (US); Dwain Norris, Provo, UT (US); Anatoliy Garan, Provo, UT (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/250,934

(22) PCT Filed: Sep. 27, 2019

(86) PCT No.: PCT/US2019/053435

§ 371 (c)(1),
(2) Date: Mar. 30, 2021

(87) PCT Pub. No.: WO2020/072298

PCT Pub. Date: Apr. 9, 2020

(65) Prior Publication Data

US 2021/0388723 A1 Dec. 16, 2021

Related U.S. Application Data

(60) Provisional application No. 62/739,725, filed on Oct. 1, 2018.

(51) Int. Cl.
*E21C 35/183* (2006.01)
*E01C 23/088* (2006.01)
(Continued)

(52) U.S. Cl.
CPC ........ *E21C 35/1831* (2020.05); *E01C 23/088* (2013.01); *E01C 23/127* (2013.01);
(Continued)

(58) Field of Classification Search
CPC ............... E21C 35/1833; E21C 35/183; E21C 35/1831; E21C 35/1835; E21C 35/1837; E01C 23/088; E01C 23/127; B28D 1/188
See application file for complete search history.

(56) References Cited

U.S. PATENT DOCUMENTS 5,536,073 A * 7/1996 Sulosky .................. E21C 25/10
299/87.1
6,290,008 B1 9/2001 Portwood et al.
(Continued)

FOREIGN PATENT DOCUMENTS

CN 201078233 6/2008
CN 201078233 Y * 6/2008
(Continued)

OTHER PUBLICATIONS

English language machine translation of Xichun, Chinese Patent Publication No. 201078233, published Jun. 25, 2008 (3 pages) (Year: 2008).*
(Continued)

*Primary Examiner* — Abby J Flynn
*Assistant Examiner* — Michael A Goodwin

(57) ABSTRACT

A tool for removing material includes a body, an ultrahard insert, and a matrix. The body has a forward portion, an opposing rear portion, and a longitudinal axis therebetween. The ultrahard insert includes an ultrahard material, and the ultrahard insert is mounted to and contacts the body proximate the forward portion. The matrix contacts the body and the ultrahard insert. The matrix is mechanically interlocked with the body and at least a portion of the matrix is
(Continued)

positioned circumferentially around at least a portion of the forward portion of the body.

18 Claims, 10 Drawing Sheets

(51) Int. Cl.
*E01C 23/12* (2006.01)
*B28D 1/18* (2006.01)

(52) U.S. Cl.
CPC ...... *E21C 35/1833* (2020.05); *E21C 35/1835* (2020.05); *B28D 1/188* (2013.01); *E21C 35/1837* (2020.05)

(56) References Cited

U.S. PATENT DOCUMENTS

| | | | | |
|---|---|---|---|---|
| 10,752,945 | B2 | 8/2020 | Zhang et al. | |
| 10,871,037 | B2 | 12/2020 | Eldredge et al. | |
| 2007/0290547 | A1* | 12/2007 | Hall | E21C 25/10 299/105 |
| 2008/0042484 | A1 | 2/2008 | Majagi et al. | |
| 2009/0256413 | A1* | 10/2009 | Majagi | B28D 1/188 299/111 |
| 2011/0052803 | A1* | 3/2011 | Bao | C04B 35/632 264/653 |
| 2013/0207445 | A1* | 8/2013 | Bell | E21C 35/18 419/18 |
| 2014/0015305 | A1* | 1/2014 | Jonker | E01C 23/088 299/79.1 |
| 2014/0265530 | A1 | 9/2014 | Fries et al. | |
| 2014/0339882 | A1 | 11/2014 | Hall et al. | |
| 2018/0003051 | A1 | 1/2018 | Kraemer et al. | |
| 2018/0363384 | A1 | 6/2018 | Bao | |
| 2018/0371844 | A1 | 12/2018 | Bao | |

FOREIGN PATENT DOCUMENTS

| | | | |
|---|---|---|---|
| CN | 101446199 | A | 6/2009 |
| CN | 101509375 | A | 8/2009 |
| CN | 101523014 | A | 9/2009 |
| CN | 203742598 | | 7/2014 |
| CN | 104153713 | A | 11/2014 |
| CN | 205876315 | | 1/2017 |
| WO | 2016026725 | A1 | 2/2016 |

OTHER PUBLICATIONS

International Search Report and Written Opinion issued in International Patent Application No. PCT/US2019/053435, dated Jan. 23, 2020, 14 pages.
First Office Action in Chinese Patent Application No. 20190077517.1, dated Apr. 25, 2022, 16 pages.
Second Office Action in Chinese Patent Application No. 20190077517.1 dated Oct. 27, 2022, 16 pages.
Third Office Action issued in Chinese Patent Application No. 20190077517.1 dated Mar. 27, 2023, 14 pages.

* cited by examiner

ROTARY TOOL WITH THERMALLY STABLE DIAMOND

CROSS-REFERENCE TO RELATED APPLICATIONS

This application claims priority to and the benefit of U.S. Provisional Application No. 62/739,725 filed on Oct. 1, 2018, the entirety of which is incorporated herein by reference.

BACKGROUND

Road construction and repair can require the removal of existing or damaged roads or surfaces. The surface of the road may contain a variety of materials that must be removed before repairs or replacement can occur. Systems for removal or fracturing of asphalt, cement, concrete, rock, or other hard and brittle materials undergo considerable damage during use. Conventional systems that utilize a series of picks on a rotating body can be used for applications such as road milling, road stabilization, Longwall or continuous mining, trench or surface mining, paint strip removal, and rumble strip milling, and can impact and break asphalt, rock, composite materials, or other material into pieces before carrying the pieces away.

The picks can wear down or fracture during usage, limiting or eliminating the effectiveness of that portion of the system or of the system as a whole. The uptime of the system depends at least partially on the durability of the picks, but also upon the speed with which the picks can be replaced or repaired. Conventional systems include ultrahard cutters brazed to the rotating body to increase the operational lifetime of the system. However, brazing the cutter to the body can weaken the cutter, and brazing the cutter to the body can make replacement or repair of the cutter costly and time-consuming, requiring the rotating body to be either stationary during the repair or for the rotating body to be replaced as a whole.

SUMMARY

In some embodiments, a tool for removing material includes a body, an ultrahard insert, and a matrix. The body has a forward portion and an opposing rear portion. The ultrahard insert includes an ultrahard material, and the ultrahard insert is positioned proximate the forward portion. The matrix contacts the body and the ultrahard insert. The matrix is mechanically interlocked with the body and at least a portion of the matrix is positioned circumferentially around at least a portion of the forward portion of the body.

In other embodiments, a system for removing material includes a rotary drum and a plurality of tools selectively connectable to the rotary drum. The rotary drum is configured to rotate about a rotational axis. At least one tool of the plurality of tools includes a body, an ultrahard insert, and a matrix. The body has a forward portion and an opposing rear portion. The ultrahard insert includes an ultrahard material, and the ultrahard insert is positioned proximate the forward portion. The matrix contacts the body and the ultrahard insert. The matrix is mechanically interlocked with the body and at least a portion of the matrix is connected to the ultrahard insert.

In yet other embodiments, a method of manufacturing a tool for removing material includes forming a body. The body has a forward portion including at least one mechanical interlocking feature in the body. The method further includes positioning an ultrahard insert at the forward portion of the body and filling at least a first space in the at least one mechanical interlocking feature in the body and a second space outside the body with a matrix precursor. The method further includes curing the matrix precursor to form a matrix adjacent the ultrahard insert and outside the body.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 2-1 is a perspective view of a tool, according to at least one embodiment of the present disclosure;

FIG. 2-2 is a perspective exploded view of the embodiment of a tool of FIG. 2-1;

FIG. 2-3 is a longitudinal cross-sectional view of the embodiment of a tool of FIG. 2-1;

FIG. 2-4 is a longitudinal cross-sectional view of the embodiment of a tool of FIG. 2-1 rotated about the longitudinal axis;

FIG. 2-5 is a longitudinal cross-sectional view of the embodiment of a tool of FIG. 2-1 in a mold during manufacturing of the tool;

FIG. 3 is a flowchart illustrating an embodiment of a method of manufacturing a tool, according to at least one embodiment of the present disclosure;

FIG. 4 is a longitudinal cross-sectional view of another tool, according to at least one embodiment of the present disclosure;

FIG. 5 is a longitudinal cross-sectional view of yet another tool, according to at least one embodiment of the present disclosure;

FIG. 10-1 is a longitudinal view of a further apexed ultrahard insert; according to at least one embodiment of the present disclosure;

FIG. 10-2 is a perspective view of the apexed ultrahard insert of FIG. 10-1;

FIG. 11-1 is a longitudinal view of a further apexed ultrahard insert; according to at least one embodiment of the present disclosure;

FIG. 11-2 is a perspective view of the apexed ultrahard insert of FIG. 11-1;

FIG. 12-1 is a longitudinal view of a further apexed ultrahard insert; according to at least one embodiment of the present disclosure;

FIG. 12-2 is a perspective view of the apexed ultrahard insert of FIG. 12-1;

FIG. 13-1 is a longitudinal view of a further apexed ultrahard insert; according to at least one embodiment of the present disclosure;

FIG. 13-2 is a perspective view of the apexed ultrahard insert of FIG. 13-1;

FIG. 14-1 is a longitudinal view of a further apexed ultrahard insert; according to at least one embodiment of the present disclosure;

FIG. 14-2 is a perspective view of the apexed ultrahard insert of FIG. 14-1;

DETAILED DESCRIPTION

This disclosure generally relates to devices, systems, and methods for removing material with a rotary device having one or more replaceable ultrahard inserts. More particularly, the preset disclosure relates to embodiments of tools with an ultrahard insert at a forward tip of the tool to fracture, break, crush, or otherwise liberate material for removal. In particular embodiments, the present disclosure related to devices and methods of manufacturing devices with an ultrahard insert fixed by a ceramic matrix shoulder circumferentially surrounding the ultrahard insert.

While a rotary tool for removing asphalt is described herein, it should be understood that the present disclosure may be applicable to other material removal tools such as drill bits, milling bits, reamers, hole openers, and other cutting tools, and for removal of other materials, such as earthen materials, cement, concrete, metal, or combinations thereof.

Figure 1:
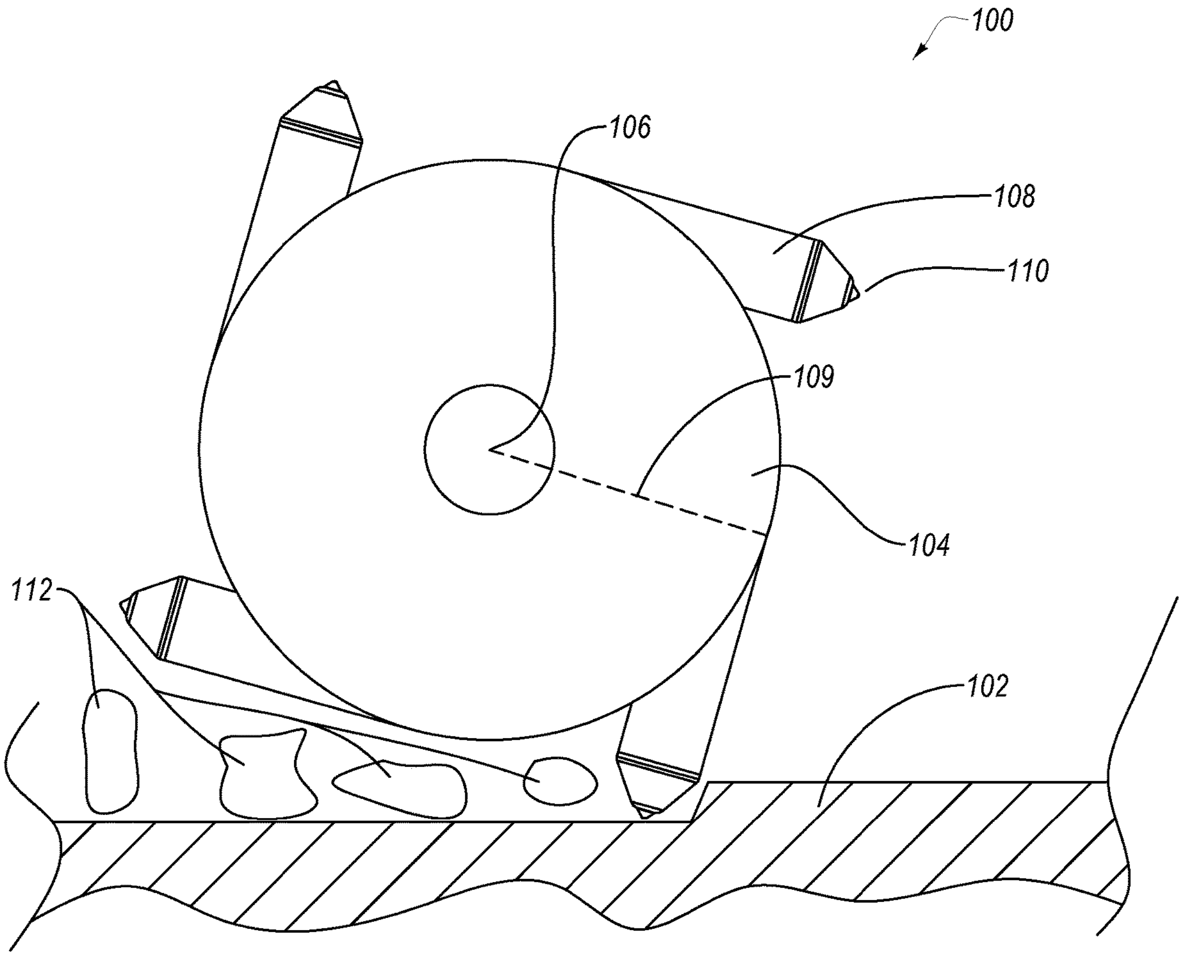
FIG. 1 is a schematic representation of a rotary system for removing material from a surface, according to at least one embodiment of the present disclosure.

FIG. 1 illustrates an embodiment of a rotary system 100 for breaking up and removing material from a formation 102. In some embodiments, the formation 102 may be asphalt. In other embodiments, the formation 102 may be earthen material, cement, concrete, metal, or combinations thereof. The rotary system 100 includes a rotary drum 104 with a rotational axis 106. The rotary drum 104 may rotate about the rotational axis 106 and carry one or more tools 108 in a substantially circular path about the circumference of the rotary drum 104 as the rotary drum 104 rotates. The movement of the rotary drum 104 may, therefore, urge the tool 108 into contact with the formation 102. In some embodiments, the tool 108 may contact the formation 102 with an ultrahard insert 110 that fractures, breaks, lifts, loosens, or otherwise removes one or more pieces 112 of the formation 102. For example, the formation 102 may be asphalt overlaying a road, and the tools 108 may break up the asphalt into pieces 112, which may then be carried away or recycled. In other examples, the formation 102 may be rock or sediment that includes or overlays ore or other commercially valuable materials. Reduction of the formation 102 to pieces 112 can facilitate mining, digging, or construction in areas with hard ground.

In some embodiments, the ultrahard insert 110 may include an ultrahard material. As used herein, the term "ultrahard" is understood to refer to those materials known in the art to have a grain hardness of about 1,500 HV (Vickers hardness in kg/mm$^2$) or greater. Such ultrahard materials can include those capable of demonstrating physical stability at temperatures above about 750° C., and for certain applications above about 1,000° C., that are formed from consolidated materials. Such ultrahard materials can include but are not limited to diamond or polycrystalline diamond (PCD) including leached metal catalyst PCD, non-metal catalyst PCD, binderless PCD, nanopolycrystalline diamond (NPD), or hexagonal diamond (Lonsdaleite); cubic boron nitride (cBN); polycrystalline cBN (PcBN); Q-carbon; binderless PcBN; diamond-like carbon; boron suboxide; aluminum manganese boride; metal borides; boron carbon nitride; and other materials in the boron-nitrogen-carbon-oxygen system which have shown hardness values above 1,500 HV, oxide, nitride, carbide and boride ceramics and/or cermets, as well as combinations of the above materials. In at least one embodiment, the insert 110 may be a monolithic carbonate PCD. For example, the insert 110 may consist of a PCD compact without an attached substrate or metal catalyst phase. In some embodiments, the ultrahard material may have a hardness value above 3,000 HV. In other embodiments, the ultrahard material may have a hardness value above 4,000 HV. In yet other embodiments, the ultrahard material may have a hardness value greater than 80 HRa (Rockwell hardness A).

In some embodiments, at least one tool 108 may be oriented tangentially to the rotation of the rotary drum 104. For example, the tool 108 may be oriented substantially perpendicularly to a radius 109 of the rotary drum 104. In other embodiments, at least one tool 108 may be oriented relative to the radial direction (i.e., the radius 109) of the rotary drum 104 at an angle in a range having a lower value, an upper value, or lower and upper values including any of 25°, 30°, 40°, 45°, 50°, 60°, 70°, 80°, 90°, 100°, 110°, 120°, or any values therebetween. For example, at least one tool 108 may be oriented relative to the radial direction of the rotary drum 104 at an angle greater than 25°. In other examples, at least one tool 108 may be oriented relative to the radial direction of the rotary drum 104 at an angle less than 120°. In yet other examples, at least one tool 108 may be oriented relative to the radial direction of the rotary drum 104 at an angle between 25° and 120°. In further examples, at least one tool 108 may be oriented relative to the radial direction of the rotary drum 104 at an angle between 45° and 110°. In yet further examples, at least one tool 108 may be oriented relative to the radial direction of the rotary drum 104 at an angle between 70° and 100°.

In some embodiments, the tool 108 is selectively coupled to the rotary drum 104. The tool 108 may have a connector thereon that connects the tool 108 to the rotary drum 104 during operation and allows for the tool 108 to be removed for replacement and/or repair. In other embodiments, the tool 108 is fixed to the rotary drum 104 by welding, brazing, adhesive, or other non-selective coupling mechanism. In yet other embodiments, the tool 108 has a connector that allows the tool 108 to rotate relative to the drum 104 about a central axis (such as axis 242 of FIGS. 2-3 and 2-4) of the tool 108, so that while used to remove material, the erosion, wear, heat generated during use, or combinations thereof can be distributed around the circumference of a cutting surface.

In some embodiments, the tool 108 may be used on any degradation tool. For example, the tool 108 may be used on a rotating downhole bit such as a "claw bit." A claw bit includes a plurality of tools 108 attached to a bottom end of the bit such that as the claw bit is rotated, a wellbore is formed. In some embodiments, the tool 108 may be attached to a ring cutter. A ring cutter may include a hollow metal cylinder, and the tool 108 may be attached to the end of the cylinder. In this manner, a cylindrical hole the diameter of the hollow metal cylinder may be drilled using the tool 108 to erode the formation or material. In some embodiments, the tool 108 may be attached to the outside surface of a rotating chain or other flexible track, such as a chain used on a chain trencher. As the chain on the chain trencher is rotated, the tool 108 may degrade the material, and a trench or other excavation may be excavated. In some embodiments, any degradation tool may be used in combination with the tool 108.

An embodiment of a tool 208 according to the present disclosure, and usable in connection with the rotary drum 104 of FIG. 1 and/or any other degradation tool, is shown in FIG. 2-1 to FIG. 2-5. The tool 208 may have an ultrahard insert 210 at a forward end of a forward portion of the tool 208. In some embodiments, the ultrahard insert 210 may be an apexed insert. For example, the insert 210 may have a cutting surface with an apex 214. In some embodiments, the apex 214 may be centered on the cutting surface, such as a conical insert. In other embodiments, the apex 214 may be off-center on the cutting surface. In yet other embodiments, the apex 214 may have a transverse dimension, such as ridge insert.

In some embodiments, the ultrahard insert 210 may have a cutting surface that is substantially conical in profile. In other embodiments, the ultrahard insert 210 may have a cutting surface that is substantially parabolic in profile. In yet other embodiments, the ultrahard insert 210 may have a profile that is trapezoidal in profile.

The tool 208 may have a matrix 216 positioned rearward of at least a portion of the ultrahard insert 210. In some embodiments, the matrix 216 may include an ultrahard material. In other embodiments, the matrix 216 may include a ceramic material. For example, the matrix 216 may include carbides, nitrides, oxides, borides, or combinations thereof. In yet other embodiments, the matrix 216 may include ultrahard particulates embedded in another material. For example, the matrix 216 may include ultrahard particulates embedded in a ceramic material.

In some embodiments, at least a portion of the ultrahard insert 210 may contact the matrix 216. In other embodiments, the ultrahard insert 210 may be connected to the matrix 216. In at least one embodiment, the ultrahard insert 210 may be cast directly into the matrix 216.

In some embodiments including a carbonate PCD, the ultrahard insert may be damaged by temperatures above a threshold temperature. For example, a carbonate PCD may be damaged by exposure to temperature greater than 2,200° F. (1,204° C.). Such embodiments may, therefore, be damaged by brazing. Carbonate PCD inserts may be cast directly into the matrix 216 as the matrix 216 may be cast at a casting and/or sintering temperature lower than a brazing temperature.

In some embodiments, the matrix 216 may be connected to a body 218 of the tool 208. The body 218 may include a rear portion 220 at a rear end of the tool 208. In some embodiments, the rear portion 220 may include a connector, such as a friction fit connector, a compression fit connector, a snap fit connector, or combinations thereof. In other embodiments, the rear portion 220 and/or body 218 may include a connector with one or more mechanical interlocking features 222 to mechanically interlock with at least a portion of a rotary drum (such as rotary drum 104 in FIG. 1) or other device to connect the tool 208 to the rotary drum or other device. In some embodiments, the mechanical interlocking feature 222 may include a twist lock; one or more threads; splines; recesses; mechanical connectors, such as bolts, screws, clips, clamps, or pins; or combinations thereof.

Figures 1, 2:
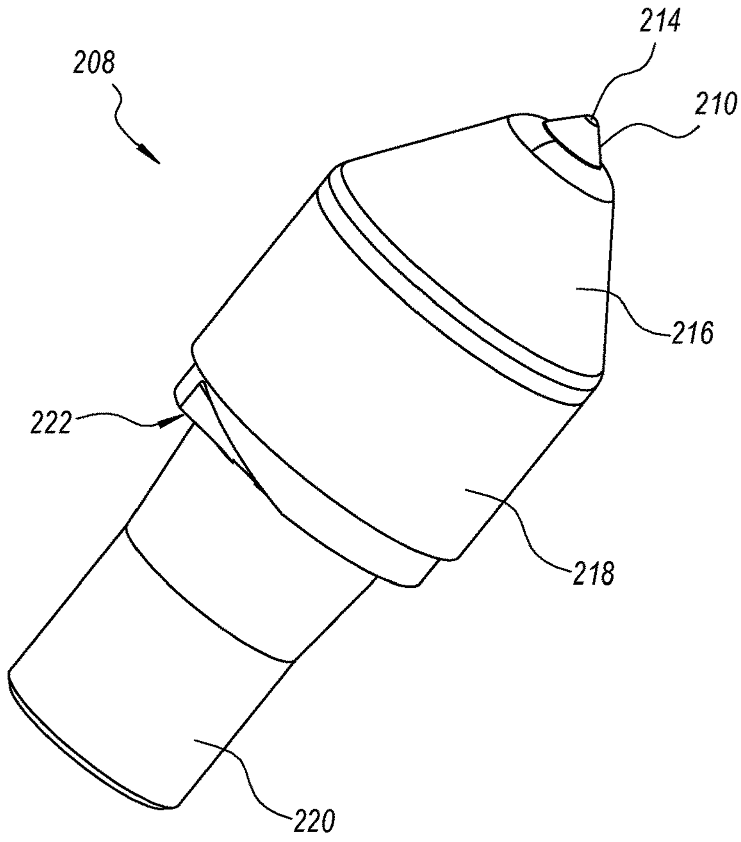
Figure 2:
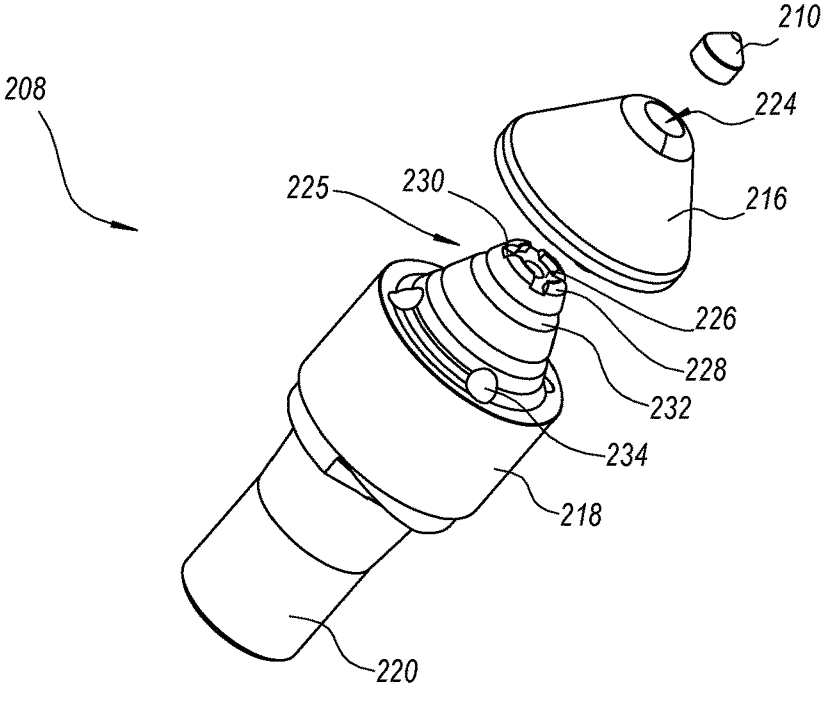

FIG. 2-2 is an exploded view of the embodiment of a tool 208 in FIG. 2-1. The matrix 216 may have an inner surface 224 that contacts the ultrahard insert 210 to limit and/or prevent movement of the ultrahard insert 210 relative to the matrix 216 and/or body 218. The body 218 may include a forward portion 225 forward of the rear portion 220 of the body 218.

In some embodiments, the forward portion 225 may generally taper in the forward direction toward a forward face 226. The forward face 226 may contact the ultrahard insert 210. For example, the ultrahard insert 210 may be positioned adjacent the forward face 226 when the matrix 216 is positioned on the forward portion 225 to limit and/or prevent movement of the ultrahard insert 210.

In some embodiments, the forward face 226 may include alignment features 228. In some embodiments, the alignment features 228 may align, or help to align, the ultrahard insert with the forward portion 225 of the body 218 during assembly. In other embodiments, the alignment features 228 may apply a reactive transverse force during operation of the tool 208 to limit damage to the matrix 216, as the matrix 216 material may be more brittle than the body material. For example, the body material may be steel and the matrix material may be a ceramic material. In yet other embodiments, the alignment features may apply a radially compressive force to the ultrahard insert 210 to limit and/or prevent movement of the ultrahard insert 210 relative to the body 218. For example, ultrahard insert 210 may be positioned in contact with the forward face 226 and radially within the alignment features 228 when the body 218 is at an elevated temperature. As the temperature of the body 218 decreases, the body material may undergo thermal contraction, provided a residual compressive force on the ultrahard insert 210.

In some embodiments, the alignment features 228 may circumferentially surround at least a portion of the ultrahard insert 210 at the forward face 226. In other embodiments, the alignment features 228 may be positioned at equal angular intervals about the ultrahard insert 210 on the forward face 226. In yet other embodiments, at least one of the alignment features 228 may be positioned at an unequal angular interval about the ultrahard insert 210 on the forward face 226.

In some embodiments, the alignment features 228 may have one or more gaps 230. In other embodiments, the gaps 230 may be positioned at equal angular intervals about the ultrahard insert 210 on the forward face 226. In yet other embodiments, at least one of the gaps 230 may be positioned at an unequal angular interval about the ultrahard insert 210 on the forward face 226. In some embodiments, the gaps 230 may allow greater surface area contact between the matrix 216 and the ultrahard insert 210. In other embodiments, the gaps 230 may allow greater thermal contraction of the alignment members 228 toward the ultrahard insert 210.

In some embodiments, the forward portion 225 of the body 218 may have one or more mechanical interlock features positioned thereon. For example, the forward portion 225 may have one or more features on the surface thereof that allow the matrix 216 to mechanically interlock with the forward portion 225 to limit and/or prevent movement of the matrix 216 relative to the body 218.

A mechanical interlock feature may include at least one recess 232 in the surface of the forward portion 225. In some embodiments, at least one recess 232 may be continuous circumferentially about the forward portion 225. In other embodiments, at least one recess 232 may be continuous in a rotational direction about the forward portion 225 in an amount that is less than a full circumference of the forward portion 225. For example, a recess 232 may extend around 10%, 20%, 30%, 40%, 50%, 60%, 70%, 80%, 90%, or any value therebetween of the circumference of the forward portion 225 of the body 218. In some embodiments, a series of recesses may be positioned on the forward portion 225 spaced apart longitudinally.

A mechanical interlock feature may, in other embodiments, include one or more channels 234 oriented from an outer surface of the forward portion 225 into the body 218. In some embodiments, a portion of the matrix 218 may be positioned in one or more of the channels 234 to mechanically interlock with the body 218. The mechanical interlock may limit and/or prevent the movement of the matrix 216 relative to the body 218 in a longitudinal direction, a transverse direction, a rotational direction, or combinations thereof.

Figures 2, 3:
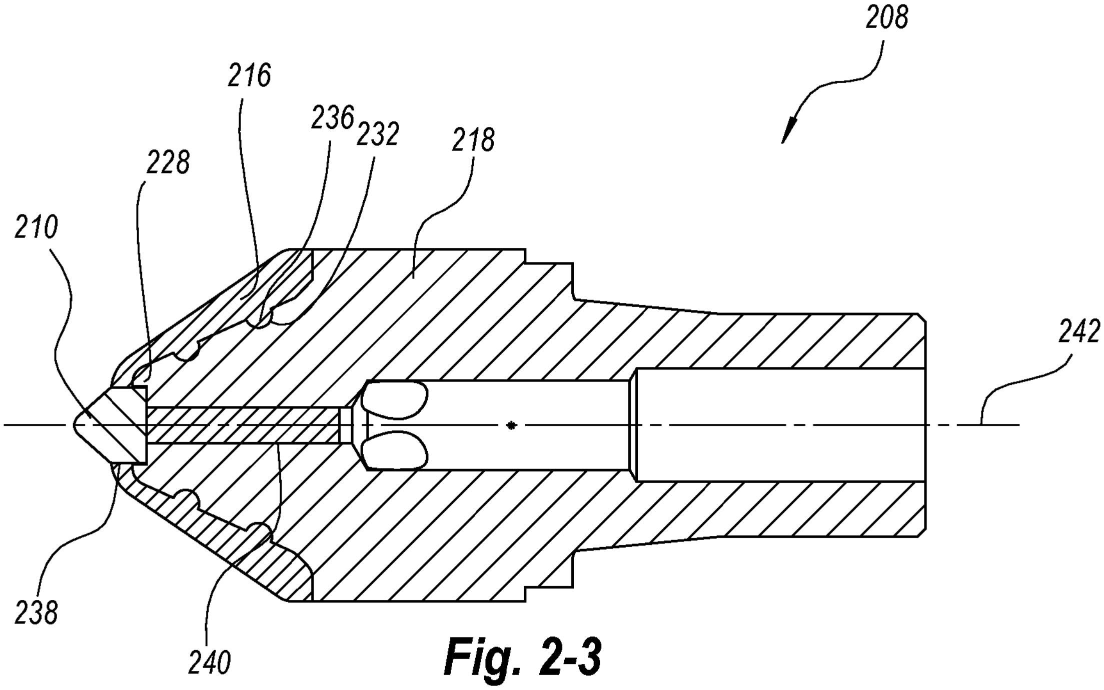

FIG. 2-3 is a longitudinal cross-sectional view of the embodiment of a tool 208 in FIGS. 2-1 and 2-2. FIG. 2-3 illustrates the interaction of the matrix 216 with the one or more recesses 232 in the body 218. As described herein, the matrix 216 may be cast in place around a portion of the body 218. Before being cast, at least a portion of the matrix precursor (such as a ceramic powder) may be positioned in the recess 232. When cast, a protrusion 236 of the matrix 216 may be positioned in the recess 232. The protrusion 236 may interlock the matrix 216 or a portion of the matrix 216 with the body 218. In the depicted embodiment, the mechanical interlock between the protrusion 236 and the recess 232 may limit and/or prevent movement of the matrix 216 relative to the body 218 in at least a longitudinal direction (i.e., in the direction parallel to a longitudinal axis 242 of the tool 208).

FIG. 2-3 also illustrates the contact between the alignment features 228 and a longitudinally oriented sidewall 238 of the ultrahard insert 210. In some embodiments, at least one of the alignment features 228 may contact a portion of the sidewall 238 of the ultrahard insert 210 in a range having a lower value, an upper value, or lower and upper values including any of 10%, 20%, 30%, 40%, 50%, 60%, 70%, 80%, 90%, 100%, or any values therebetween. For example, at least one of the alignment features 228 may contact more than 10% of the sidewall 238 of the ultrahard insert 210. In other examples, at least one of the alignment features 228 may contact less than 100% of the sidewall 238 of the ultrahard insert 210. In yet other examples, at least one of the alignment features 228 may contact between 10% and 100% of the sidewall 238 of the ultrahard insert 210. In further examples, at least one of the alignment features 228 may contact between 20% and 90% of the sidewall 238 of the ultrahard insert 210. In yet further examples, at least one of the alignment features 228 may contact between 30% and 80% of the sidewall 238 of the ultrahard insert 210.

In some embodiments, the body 218 may include a central channel 240 into which a portion of the matrix 216 may be positioned. Having a portion of the matrix 216 positioned in the central channel 240 may provide additional contact surface between the matrix 216 and the body 218 and/or between the matrix 216 and the ultrahard insert 210. In some embodiments, the portion of the matrix 216 in the central channel 240 may limit and/or prevent movement of the ultrahard insert 210 in the longitudinal direction (i.e., the direction parallel to the longitudinal axis 242) during operation by providing longitudinal support to the ultrahard insert 210.

Figures 2, 3, 4:
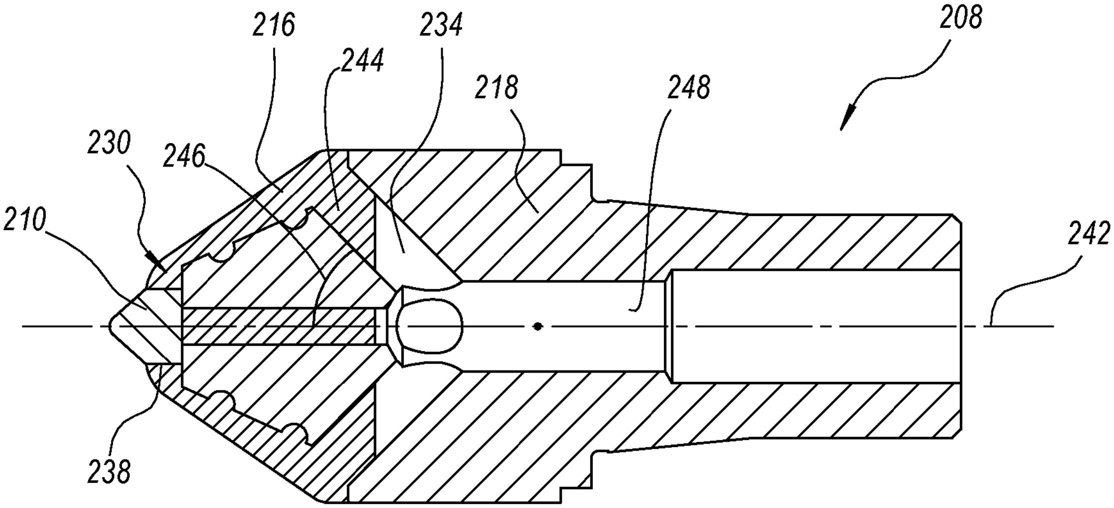

FIG. 2-4 is a longitudinal cross-sectional view of the embodiment of a tool 208 in FIG. 2-3 rotated 45° about the longitudinal axis 242. In the depicted embodiment, the channels 234 are positioned at equal 90° intervals about the longitudinal axis 242, such that channels 234 oppose one another in longitudinal cross-section. In other embodiments, a tool 208 may include channels 234 at other angular orientations about the longitudinal axis 242.

As described in relation to FIG. 2-2, FIG. 2-4 illustrates an example of a mechanical interlock between the matrix 216 and the body 218 at the channels 234. A channel extension 244 of the matrix 216 may extend into one or more of the channels 234 to lock the matrix 216 to the body 218. In some embodiments, thermal contraction of the body 218 may radially compress the channel extensions 244, further locking the matrix 216 relative to the body 218. In at least one embodiment, the channels 234 may allow for positioning of a matrix precursor around part of the body during filling of a mold.

In some embodiments, at least one channel 234 may be oriented at an angle 246 relative to the longitudinal axis 242. At least one channel 234 may be oriented to provide a mechanical interlock, as well as providing a filling path for a mold during manufacturing. In some embodiments, the angle 246 of at least one channel 234 relative to the longitudinal axis 242 may be in a range having an upper value, a lower value, or upper and lower values including any of 10°, 20°, 30°, 40°, 50°, 60°, 70°, 80°, 90°, or any values therebetween. For example, the angle 246 of at least one channel 234 relative to the longitudinal axis 242 may be greater than 10°. In other examples, the angle 246 of at least one channel 234 relative to the longitudinal axis 242 may be less than 90°. In yet other examples, the angle 246 of at least one channel 234 relative to the longitudinal axis 242 may be between 10° and 90°. In further examples, the angle 246 of at least one channel 234 relative to the longitudinal axis 242 may be between 20° and 80°. In yet further examples, the angle 246 of at least one channel 234 relative to the longitudinal axis 242 may be between 30° and 70°.

As the tool 208 is rotated 45° in FIG. 2-4 relative to FIG. 2-3, the longitudinal cross-section passes through the gaps 230 adjacent the ultrahard insert 210. A portion of the matrix 216 may be positioned in a gap 230 and contact a portion of the sidewall 238 of the ultrahard insert 210. In some embodiments, at least one of the alignment features 228 may contact a portion of the sidewall 238 of the ultrahard insert 210 in a range having a lower value, an upper value, or lower and upper values including any of 10%, 20%, 30%, 40%, 50%, 60%, 70%, 80%, 90%, 100%, or any values therebetween. For example, at least one of the alignment features 228 may contact more than 10% of the sidewall 238 of the ultrahard insert 210. In other examples, at least one of the alignment features 228 may contact less than 100% of the sidewall 238 of the ultrahard insert 210. In yet other examples, at least one of the alignment features 228 may contact between 10% and 100% of the sidewall 238 of the ultrahard insert 210. In further examples, at least one of the alignment features 228 may contact between 20% and 90% of the sidewall 238 of the ultrahard insert 210. In yet further examples, at least one of the alignment features 228 may contact between 30% and 80% of the sidewall 238 of the ultrahard insert 210.

In some embodiments, the tool 208 may include a central bore 248 in communication with the channels of the body 218. The central bore 248 may extend along a portion of the longitudinal axis 242 through the body 218 and be open on a rear end of the body 218. During manufacturing, a matrix precursor may be positioned in and/or around the body 218 via the central bore 248, such as in the embodiment shown in FIG. 2-5.

FIG. 2-5 is a longitudinal cross-sectional view of the embodiment of a tool 208 in a mold 250 during assembly. The matrix 216 of the tool 208 may be cast in the mold 250 around the ultrahard insert 210. The matrix precursor 252 that is cast and/or sintered to form the matrix 216 may be a powder, metal alloy, epoxy, gel, other fluid, or combinations thereof. Upon positioning in the mold 250, the matrix precursor 252 may complementarily form with a mechanical interlock feature such as a recess 232 or channel 234. Upon curing of the matrix precursor 252, the matrix 216 may become mechanically interlocked with at least one other part of the tool 208. In some embodiments, the curing of the matrix precursor 252 to a solid matrix 216 may occur at an elevated temperature (e.g., between 1,112° F. (600° C.) and 2,192° F. (1,200° C.)) and the matrix material may have a greater coefficient of thermal expansion than the ultrahard insert 210. The thermal compression of the matrix 216 during cooling from the curing process may apply a compressive force to the ultrahard insert 210, thereby compressing the ultrahard insert 210.

FIG. 3 is a flowchart 300 illustrating a method 300 of manufacture of a tool according to the present disclosure. The method 300 may include forming a body of the tool at 302. In some embodiments, forming the body may include forming one or more mechanical interlock features into a surface of the body and/or within the body. For example, forming the body may include forming one or more surface features, such as recesses, and/or forming one or more channels therein. In other embodiments, forming the body may include forming a forward surface and/or alignment features to receive an ultrahard insert, align an ultrahard insert, support an ultrahard insert, or combinations thereof.

The method 300 may further include positioning an ultrahard insert at a front end of the body at 304. In some embodiments, positioning the ultrahard insert may include positioning the ultrahard insert against a forward surface of the body. In other embodiments, positioning the ultrahard insert may include positioning the ultrahard insert in contact with one or more alignment features of the body. In at least one embodiment, positioning the ultrahard insert may include press fitting the ultrahard insert into a front end of the body, for example, in one or more alignment features.

In some embodiments, forming the body may further include shaping the body. For example, the body may be cut or machined to a final shape or one or more mechanical interlock features may be formed in the body. The body may be shaped by removing material by grinding, laser ablation, mechanical cutting, hydrojet cutting, electrical discharge machining, other material removal techniques, or combinations thereof.

In some embodiments, the method 300 may include forming the ultrahard insert prior to positioning the insert in the body at 304. Forming the insert may include sintering the insert in a high temperature high pressure press. In some embodiments, the ultrahard insert may be sintered with a carbonate catalyst and/or carbonate binder. In embodiments with a carbonate catalyst, the insert may be sintered in a pressure range of 6 GPa to 10 GPa and a temperature range of 2,732° F. (1,500° C.) to 4,532° F. (2,500° C.). For example, the insert may include a PCD having a magnesium carbonate catalyst and/or binder. In some embodiments, the binder may be at least partially leached from the insert. In other embodiments, the binder may be at least decomposed at an elevated temperature. For example, a PCD with a magnesium carbonate catalyst may have at least some of the magnesium carbonate decomposed into carbon monoxide and/or carbon dioxide by heating the insert to a temperature of more than 932° F. (500° C.).

In some embodiments, at least 50% of the binder material may be removed from the ultrahard material after forming the insert. In other embodiments, at least 80% of the binder material may be removed from the ultrahard material after forming the insert. In yet other embodiments, substantially all of the binder material may be removed from the ultrahard material after forming the insert. In yet further embodiments, less than 5% of the binder material may be removed from the ultrahard material after forming the insert.

In some embodiments, forming the ultrahard insert may further include shaping the ultrahard insert. For example, the ultrahard insert may be cut or machined to a final shape or one or more mechanical interlock features may be formed in the insert. The ultrahard insert may be shaped by removing material by grinding, laser ablation, mechanical cutting, hydrojet cutting, electrical discharge machining, other material removal techniques, or combinations thereof.

After positioning the ultrahard insert at the front end of the body at 304, the method 300 may further include filling space in the body and adjacent to the ultrahard insert with a matrix precursor at 306. For example, the ultrahard insert may be positioned in a mold with the body and a matrix precursor (e.g., a powder, metal alloy, epoxy, gel, other fluid, or combinations thereof) may be positioned in the mold to fill space in the mold contacting and/or surrounding at least a portion of the ultrahard insert and at least a portion of the body. The matrix precursor may become the matrix of the tool and/or blades upon curing the matrix precursor into the matrix at 308.

In some embodiments, curing the matrix adjacent the ultrahard insert and outside the body may include curing the matrix within the body, as well. For example, at least a portion of the matrix precursor may be positioned within one or more channels in the body upon curing. In such embodiments, the matrix precursor may cure into a matrix that is mechanically interlocked with the body. In at least one embodiment, at least a portion of the matrix is cured outside the body and at least another portion of the matrix is cured inside the body (e.g., channel extensions 244 shown in FIG. 2-4).

In some embodiments, the matrix precursor may include or be made of a ceramic powder. In other embodiments, the matrix precursor may include or be made of a tungsten carbide powder. In yet other embodiments, the precursor material may include or be made of another carbide powder. In still other embodiments, the matrix precursor may include or be made of a metal. In further embodiments, the matrix precursor may include or be made of a material in a suspension or mixed with a fluid substrate. In yet further embodiments, the matrix precursor may include ultrahard particulates to impregnate the matrix with ultrahard particulates to improve wear resistance of the matrix. In at least one embodiment, the matrix precursor may include a low melting point (i.e., less than 2,200° F. (1,204° C.)) binder alloy to cast the matrix with the ultrahard insert.

The method 300 may further include curing the matrix at a temperature of no higher than 2,200° F. (1,204° C.). Curing the matrix precursor to affix the ultrahard insert may include heating the matrix precursor to an elevated temperature. A curing temperature less than 2,200° F. (1,204° C.) may limit damage to carbonate PCDs, increasing the operational lifetime of the carbonate PCD and, hence, the operational lifetime of the tool. In some embodiments, the curing temperature may be less than 1,900° F. (1,037° C.). In other embodiments, the curing temperature may be less than 1,700° F. (927° C.). In yet other embodiments, the curing temperature may be less than 1,500° F. (816° C.).

During curing, the matrix may develop one or more cracks, voids, fractures, or other imperfections. The imperfections can be repaired by a braze or filler material (e.g., metal) applied to the matrix. For example, a crack in the matrix may be filled and repaired using a braze or filler material. A fractured piece may be replaced and repaired using a brazing process or a filler material. In some embodiments, brazing or filling the matrix provides a localized thermal energy that does not damage the ultrahard insert.

FIG. 4 is a side cross-sectional view of another embodiment of a tool 408, according to the present disclosure. The tool 408 includes an ultrahard insert 410 in contact with and supported by a matrix 416 bolster. While the ultrahard insert 410 is illustrated as an apexed insert, in other embodiments, the ultrahard insert 410 may have any geometry suitable for the material being removed. For example, the ultrahard insert 410 may having a planar cutting surface, a plurality of planar cutting surfaces, a conical cutting surface, a curved cutting surface, or combinations thereof.

The ultrahard insert 410 may be mechanically locked to the matrix 416 by thermal compression of the matrix 416 during cooling from the curing process. In other embodiments, the ultrahard insert 410 is mechanically locked to the matrix 416 by one or more mechanical interlocking features, such as used in joining the matrix and body described in relation to FIG. 2-3 and FIG. 2-4. For example, the ultrahard insert 410 may include one or more recesses and/or protrusions, while the matrix 416 may include one or more complementary protrusions and/or recesses to interlock with the ultrahard insert. For example, the recesses and/or protrusions can include tapers, grooves, posts, indentions, extensions, or any other surface features that allow longitudinal and/or rotational mechanical interlock between the ultrahard insert 410 and the matrix 416. In other examples, the ultrahard insert 410 is joined to the matrix 416 by press fitting, shrink fitting, or other friction or compression joining techniques.

In other embodiments, the ultrahard insert 410 is brazed to a matrix 416 to join the matrix 416 and ultrahard insert 410. In other examples, a tungsten carbide matrix 416 may be brazed to an ultrahard insert 410 in addition to a mechanical interlock to add strength to the mechanical joint between the matrix 416 and ultrahard insert 410. In other embodiments, the ultrahard insert 410 is brazed to the body 418 of the tool 408 to couple the ultrahard insert 410 directly to the body 418. For example, the ultrahard insert 410 may be affixed to the body 418 independently of a matrix 416, bolster, or other similar component.

The matrix 416 is joined to the body 418 of the tool 408. In some embodiments, the matrix 416 and body 418 are joined by any of the mechanical interlocks described in relation to FIG. 2-3 and FIG. 2-4. In other embodiments, the matrix 416 and body 418 are joined by brazing. For example, a tungsten carbide matrix 416 may be brazed to a steel body 418 to join the matrix 416 and body 418. In other examples, a tungsten carbide matrix 416 may be brazed to a steel body 418 in addition to a mechanical interlock to add strength to the mechanical joint between the matrix 416 and body 418. In at least one example, the matrix 416 and body 418 may have a mechanical interlock that limits and/or prevents longitudinal movement of the matrix 416 relative to the body 418 (such as circumferential grooves as described in relation to FIG. 2-3), while the brazing limits and/or prevents rotational movement of the matrix 416 relative to the body 418. In at least another example, the matrix 416 and body 418 may have a mechanical interlock that limits and/or prevents rotational movement of the matrix 416 relative to the body 418 (such as longitudinal grooves), while the brazing limits and/or prevents longitudinal movement of the matrix 416 relative to the body 418.

Figures 2, 3, 4, 5:
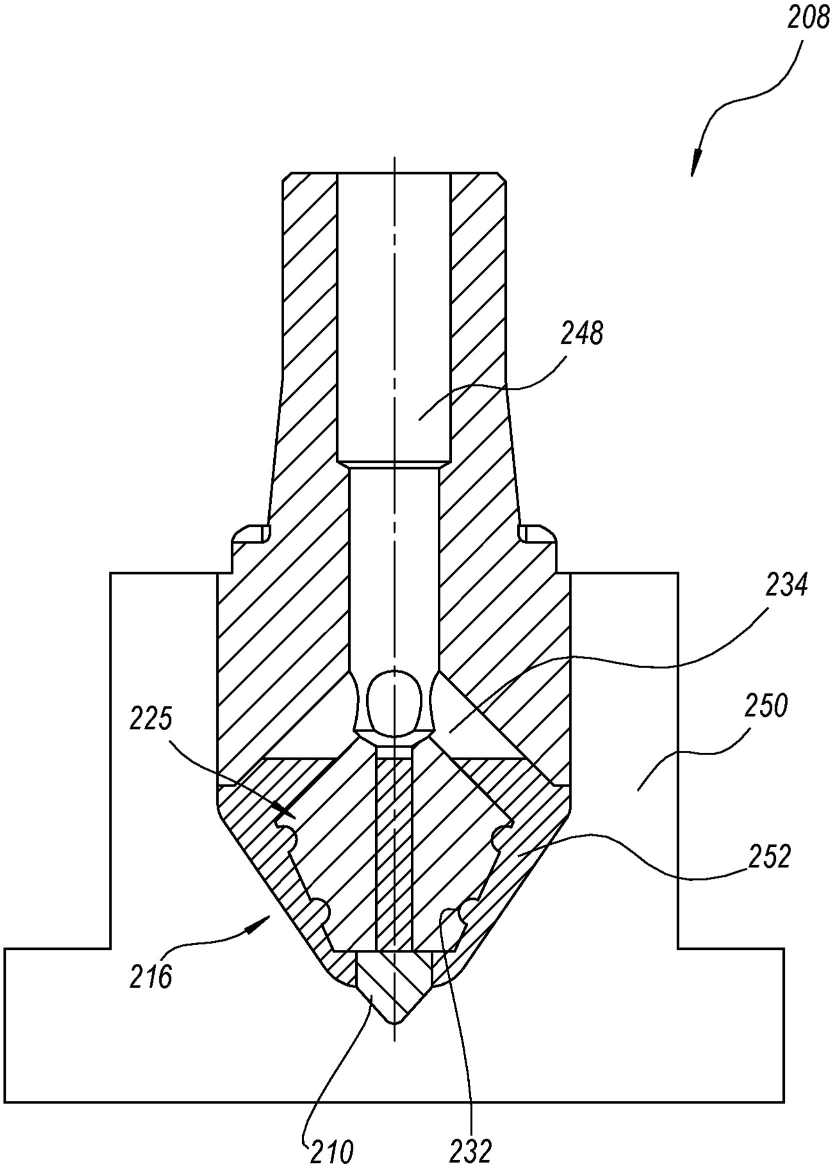
Figure 3:
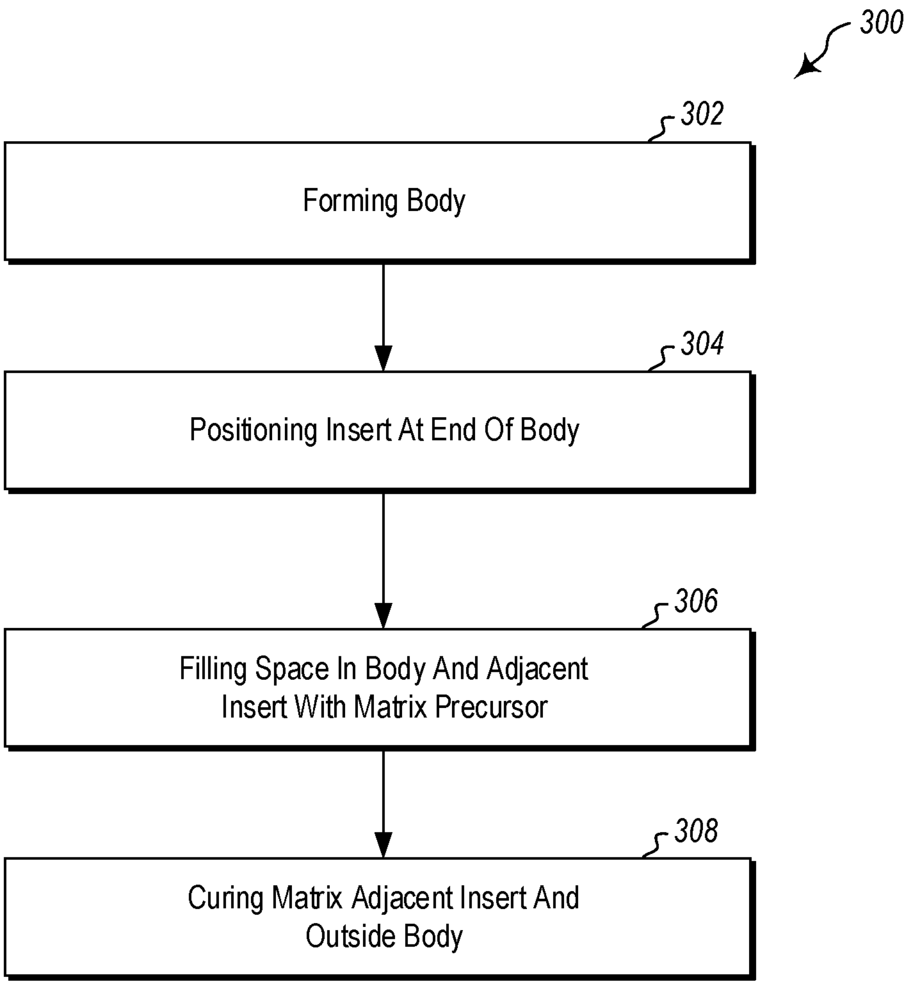
Figure 4:
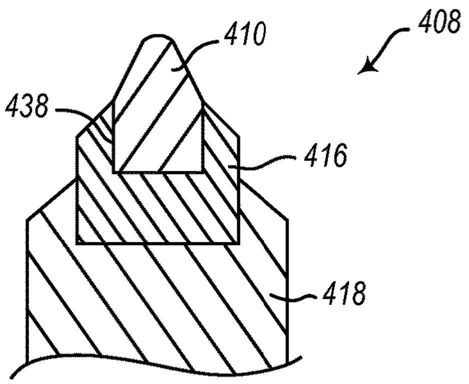
Figure 5:
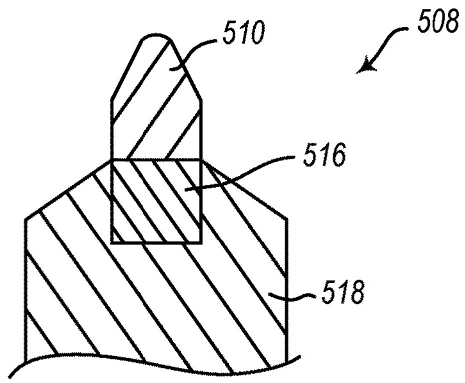

FIG. 5 is a side cross-sectional view of another embodiment of a tool 508 according to the present disclosure. In some embodiments, the ultrahard insert 510 is brazed to a matrix 516 bolster at an end of the ultrahard insert 510 without the matrix 516 contacting or supporting the sides of the ultrahard insert 510. For example, the ultrahard insert 510 may be positioned above the matrix 516, which is, in turn, connected to the body 518. The matrix 516 and body 518 may be joined by any combination of methods described in relation to FIG. 2-3 and FIG. 2-4 or FIG. 4.

Figure 6:
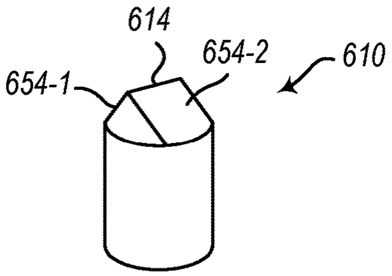
FIG. 6 is a perspective view of an apexed ultrahard insert, according to at least one embodiment of the present disclosure.

While the ultrahard inserts illustrated in FIG. 4 and FIG. 5 are illustrated as conical, apexed inserts, in other embodiments, the ultrahard inserts of the tools described herein may have other cross-sectional shapes. For example, FIG. 6 is a perspective view of a ridge or a chisel shaped ultrahard insert 610. The ridge ultrahard insert 610 has a plurality of planar cutting surfaces 654-1, 654-2 with an apex 614 positioned therebetween. The apex 614 is positioned along a width of the ultrahard insert 610, such that the cutting surfaces 654-1, 654-2 form a chisel or axe shape across the width of the ultrahard insert 610. In some embodiments, the apex 614 is positioned bisecting the ultrahard insert through a center axis of the ultrahard insert 610 and follows a diameter of the ultrahard insert 610. For example, the cutting surfaces 654-1, 654-2 may be symmetrical about the apex 614. In other embodiments, the apex 614 is displaced from a center of the ultrahard insert 610, such that the ultrahard insert 610 is asymmetrical.

In some embodiments, the ridge ultrahard insert 610 may include an angled surface, other than the planar cutting surfaces 654-1, 654-2, oriented down away from the apex

614. In this manner, the ridge ultrahard insert may be a double angle ridge insert 610.

Figure 7:
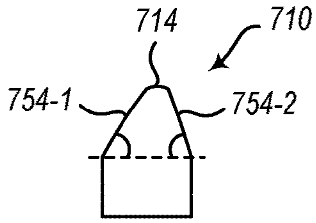
FIG. 7 is a longitudinal cross-sectional view of another apexed ultrahard insert, according to at least one embodiment of the present disclosure.

FIG. 7 is a side view of an asymmetrical ridge ultrahard insert 710 (e.g., a bullet chisel insert). For example, the apex 714 is positioned further from a first cutting surface 754-1 and closer to a second cutting surface 754-2. The first cutting surface 754-1 is oriented at a lower angle than the second cutting surface 754-2, resulting in an ultrahard insert 710 that is asymmetrical about the apex 714.

Figure 8:
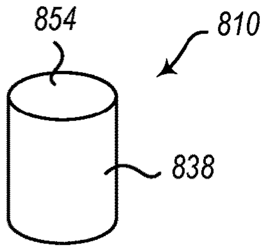
FIG. 8 is a perspective view of a planar ultrahard insert, according to at least one embodiment of the present disclosure.

FIG. 8 is a perspective view of another embodiment of an ultrahard insert 810 that may be used in a tool, according to the present disclosure. For example, the ultrahard insert 810 includes a planar cutting surface 854 that is approximately orthogonal to the sidewall 838 of the ultrahard insert 810. The ultrahard insert 810 may be a shear cutting element that lacks an apex and uses an edge of the planar cutting surface 854 to remove material.

Figure 9:
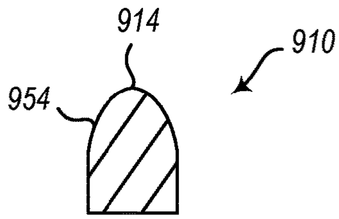
FIG. 9 is a longitudinal cross-sectional view of yet another apexed ultrahard insert; according to at least one embodiment of the present disclosure.

FIG. 9 is a side cross-sectional view of yet another embodiment of an ultrahard insert 910 with an apex 914. In some embodiments, such as the bullet cutting element illustrated in FIG. 9, an ultrahard insert 910 includes a curved cutting surface 954 with an apex 914. In some examples, the apex 914 is positioned in the center of the curved cutting surface 954 which is curved in both the longitudinal direction and the rotational direction, similar to a bullet tip. In other examples, the apex 914 is elongated across a width of the ultrahard insert 910, and the cutting surface 954 is curve in one direction forming a curved ridge. Different cutting surface geometries may exhibit different cutting behaviors depending on the application. It should be understood that the tools described herein may be used with ultrahard inserts with any cutting surface geometries.

Figures 1, 10:
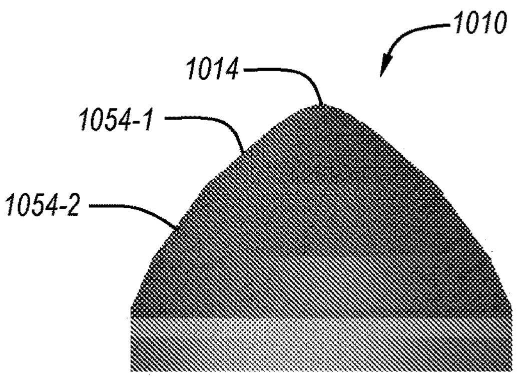
Figures 2, 10:
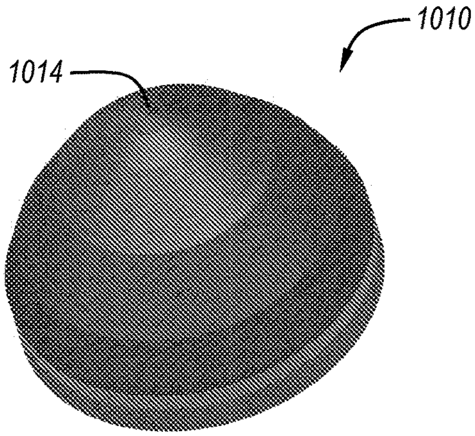

FIG. 10-1 and FIG. 10-2 are side and perspective views of another embodiment of an ultrahard insert 1010, according to the present disclosure. The ultrahard insert 1010 has a generally domed shape including a plurality of curved cutting surfaces 1054-1, 1054-2 that are curved in the rotational direction and planar in the longitudinal direction. For example, in a longitudinal cross-section, the first cutting surface 1054-1 and second cutting surface 1054-2 are both planar and oriented at different angles. As shown in FIG. 10-2, however, some or each cutting surface of the ultrahard insert can be curved and continuous in the rotational/circumferential direction. While the apex 1014 of the ultrahard insert 1010 is illustrated as pointed in the embodiment shown in FIGS. 10-1 and 10-2, the apex 1014 of the ultrahard insert 1010 may have other geometries or shapes according to embodiments of the present disclosure. For instance, an apex 1014 may be pointed, planar (e.g., frustoconical) as shown in the embodiment in FIG. 11-1, rounded/curved as shown in the embodiment in FIG. 12-1, or have any other suitable shape.

Figures 1, 11:
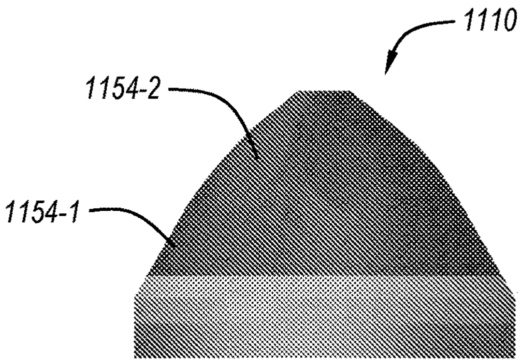
Figures 2, 11:
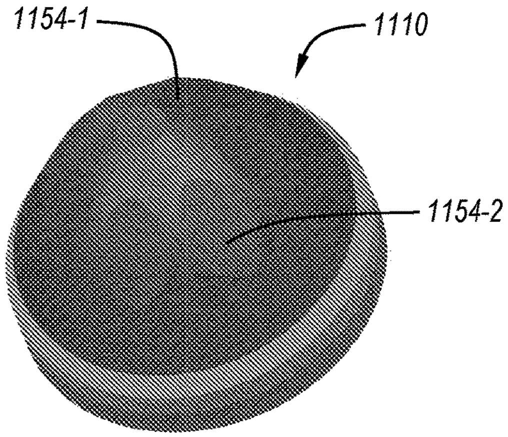

In other embodiments, an ultrahard insert optionally has one or more facets on a curved cutting surface. FIG. 11-1 and FIG. 11-2 illustrate another embodiment of an ultrahard insert 1110. FIG. 11-1 is a side view of the ultrahard insert 1110 with a first cutting surface 1154-1 that is curved in both the longitudinal direction and the rotational direction. The second cutting surface 1154-2 is one of a plurality of planar facets that are positioned in the first cutting surface 1154-1. FIG. 11-2 is a perspective view showing the plurality of second cutting surfaces 1154-2 distributed at equal angular intervals about the first cutting surface 1154-1. In other embodiments, the planar facets of the second cutting surface 1154-2 are positioned at unequal angular intervals about the first cutting surface 1154-1. The scale of the planar facets 1154-1, 1154-2 is illustrative of some example embodiments, but in other embodiments the planar faces 1154-1, 1154-2 can have a greater or lesser longitudinal and/or rotational dimensions.

Figures 1, 12:
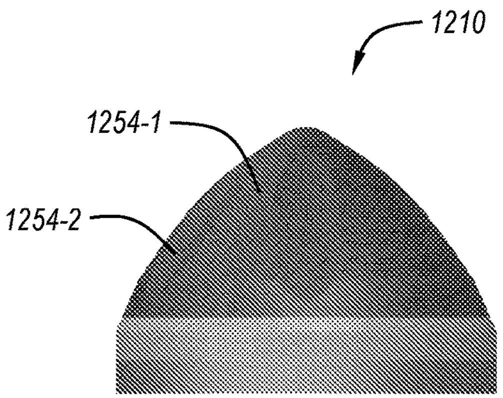
Figures 2, 12:
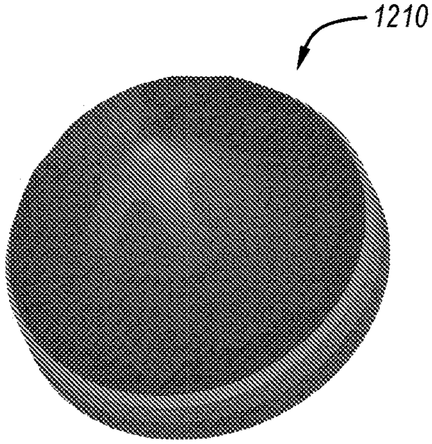

In yet other embodiments, the facets are concave or convex regions within a curved dome cutting surface. For example, FIG. 12-1 is a side view of an embodiment of an ultrahard insert 1210 with a domed or bullet-shaped first cutting surface 1254-1 and a plurality of concave regions 1254-2 defining a second cutting surface 1254-2. The concave regions 1254-2 are positioned at equal angular intervals about the first cutting surface 1254-1, but may be at unequal interviews, or of a different scale in other embodiments. FIG. 12-2 is a perspective view of the ultrahard insert 1210 of FIG. 12-1.

Figures 1, 13:
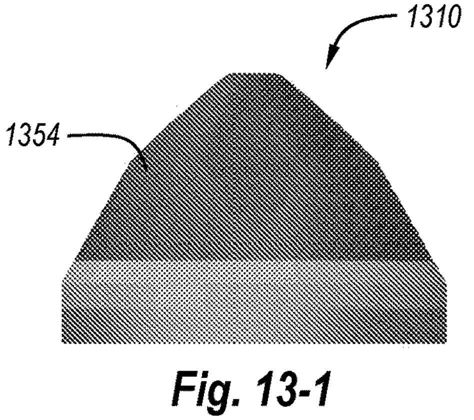
Figures 2, 13:
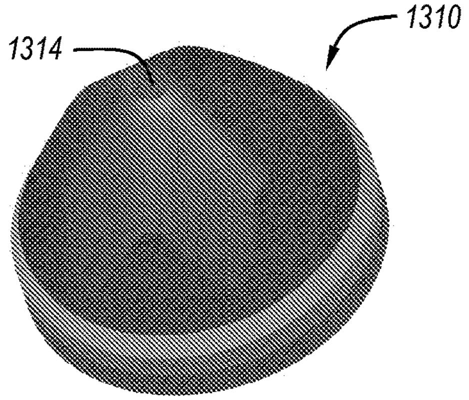
Figures 1, 14:
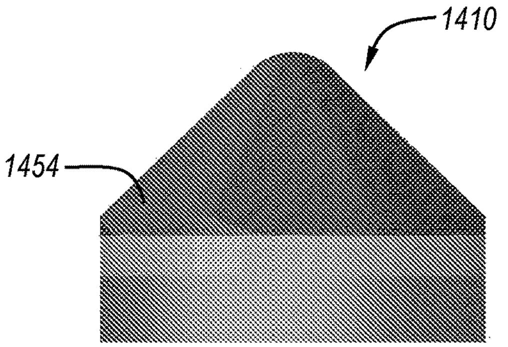
Figures 2, 14:
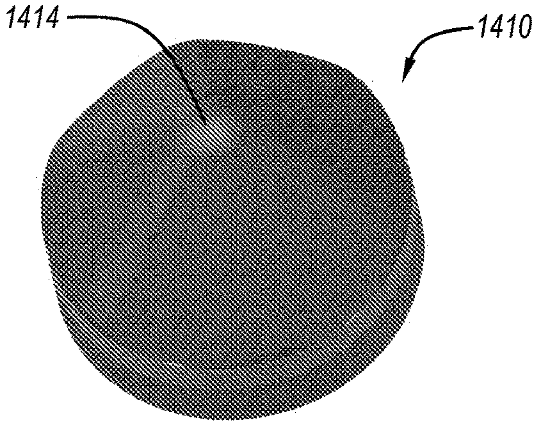

In further embodiments, an ultrahard insert 1310, such as shown in FIGS. 13-1 and 13-2, includes a cutting surface 1354 that is a plurality of planar facets abutting one another in segments angularly positioned about the ultrahard insert 1310. For example, the cutting surface 1354 of the embodiment of an ultrahard insert 1310 of FIG. 13-1 has seven planar facets that meet at the apex 1314, as shown in the perspective view of FIG. 13-2. In still further embodiments, an ultrahard insert 1410, such as shown in FIGS. 14-1 and 14-2, includes a cutting surface 1454 that has a plurality of concave regions abutting one another in regions angularly positioned about the ultrahard insert 1410. For example, the cutting surface 1454 of the embodiment of an ultrahard insert 1410 of FIG. 14-1 has seven concave regions that meet at the apex 1414, as shown in the perspective view of FIG. 14-2.

The embodiments of ultrahard inserts described herein may have more aggressive removal properties than other shapes of ultrahard inserts for at least some materials. The manufacturing methods and systems described herein may provide improved insert retention and/or protection to remove material more aggressively than some pick tools. In some embodiments, the tools may have additional variations in geometry that further increase the durability and/or operational lifetime of the tool.

Figure 15:
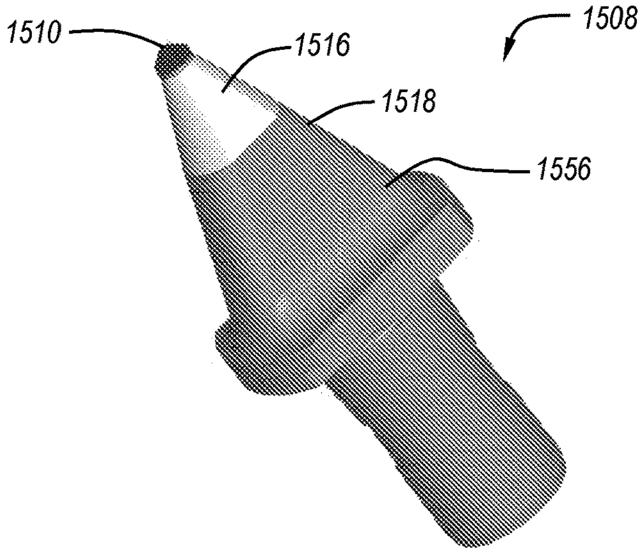
FIG. 15 is a perspective view of another tool, according to at least one embodiment of the present disclosure.

FIG. 15 is a perspective view of another embodiment of a tool 1508, according to the present disclosure. In some embodiments, a tool 1508 has an ultrahard insert 1510, a matrix 1516, a body 1518, or combinations thereof that have a planar surface 1556. For example, FIG. 15 illustrates a tool 1508 with a body 1518 with a planar surface 1556 that abuts an approximately conical matrix 1516 and conical ultrahard insert 1510. In other examples, the matrix 1516 may have a planar surface 1556 while the body 1518 lacks a planar surface.

Figure 16:
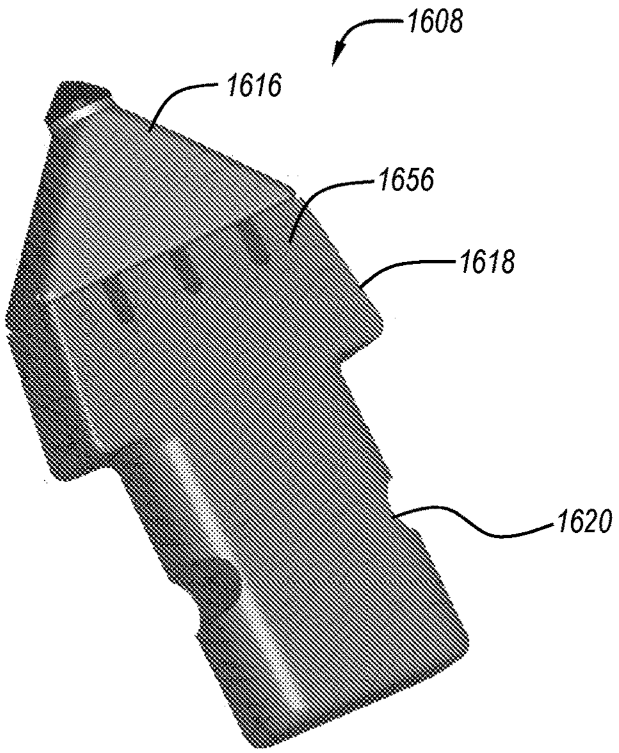
FIG. 16 is a perspective view of yet another tool, according to at least one embodiment of the present disclosure.

In other embodiments, such as the tool 1608 illustrated in perspective view in FIG. 16, more than one portion of the tool 1608 has a planar surface 1656. For example, the embodiment of a tool 1608 in FIG. 16 has a matrix 1616 and a body 1618 that both have a planar surface 1656 down to a rear portion 1620 of the body 1618. In some embodiments, the matrix 1616 and body 1618 form a coherent and/or continuous planar surface 1656. In other embodiments, the matrix 1616 and body 1618 each have a planar surface 1656 that are positioned and/or oriented at an angle to one another.

Figure 17:
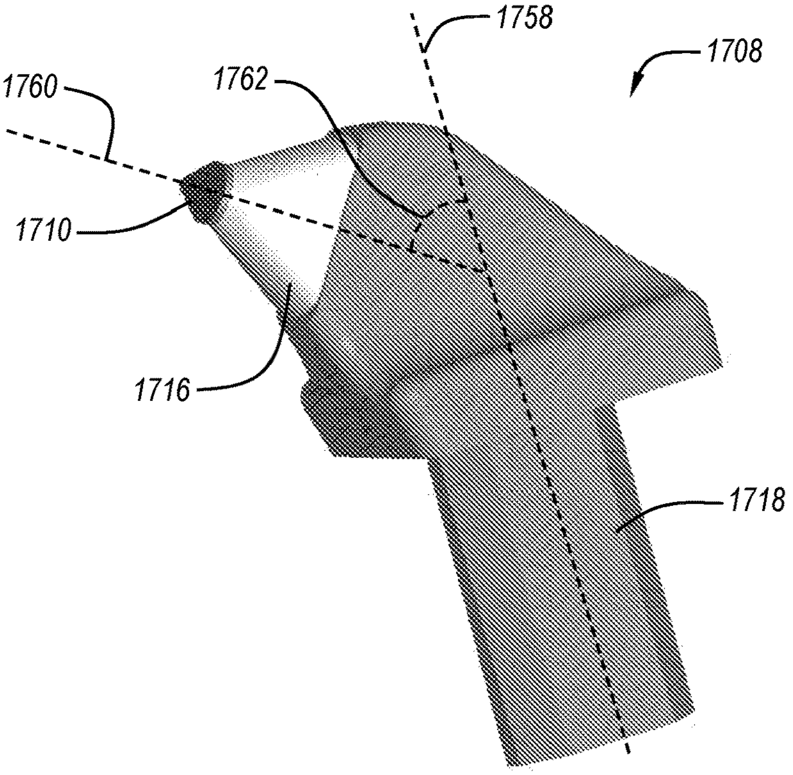
FIG. 17 is a perspective view a further tool, according to at least one embodiment of the present disclosure.

Referring now to FIG. 17, in yet other embodiments, a tool 1708 has an ultrahard insert 1710, a matrix 1716, a body 1718, or combinations thereof that are oriented at an angle to one another. For example, the body 1718 has a body axis 1758 and the ultrahard insert 1710 has an insert axis 1760. While the other embodiments described herein have the body axis 1758 and the insert axis 1760 coaxial, some embodiments have the body axis 1758 and the insert axis 1760 positioned at an angle 1762 to one another. In some embodiments, the angle 1760 is in a range having a lower value, an upper value, or lower and upper values including any of 1°, 5°, 10°, 15°, 20°, 30°, 40°, 45°, 50°, 60°, 65°, or any values therebetween. For example, the angle 1760 may be greater than 1°. In other examples, the angle 1760 may be less than 65°. In yet other examples, the angle 1760 may be between 1° and 65°. In further examples, the angle 1760 may be between 5° and 60°. In at least one example, the angle 1760 may be between 35° and 50°, or about 45°.

Figure 18:
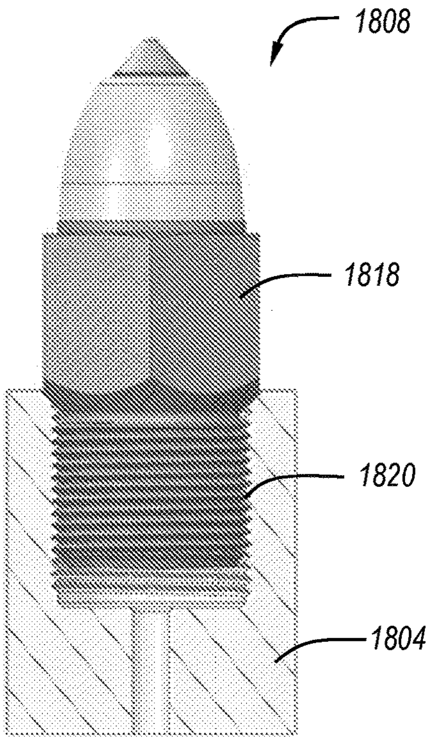
FIG. 18 is a side partial cross-sectional view of a tool connected to a drum, according to at least one embodiment of the present disclosure.
Figure 19:
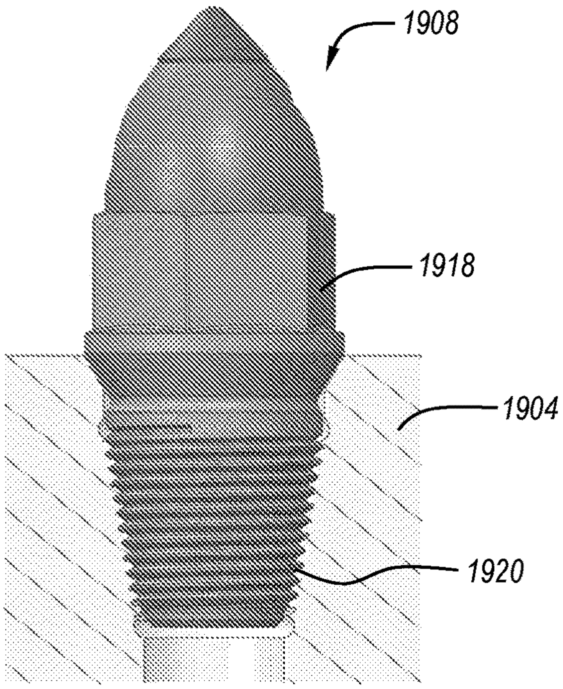
FIG. 19 is a side partial cross-sectional view of another tool connected to a drum, according to at least one embodiment of the present disclosure.

As described herein, some embodiments of tools include one or more connection features at a rear portion to allow selective connection between the tool and a rotary drum. FIG. 18 is a side cross-sectional view of a portion of a drum 1804 with an embodiment of a tool 1808 connected thereto. The tool 1808 has a body 1818 with a threaded rear portion 1820. The body 1818 may further have faceted sides to allow the tool 1808 to be torqued to mate the threaded rear portion 1820 to the drum 1804. Referring now to FIG. 19, in other embodiments, a tool 1908 has a tapered rear portion 1920, such that a compressive force applied to the tool 1908 compresses the tapered rear portion 1920 against the complementarily tapered connection in the drum 1904. This arrangement may facilitate installation of the tool 1908 and/or distribute the compressive force to the drum 1904 such that the force is not borne primarily or solely by the threads of the rear portion 1920.

The embodiments of tools have been primarily described with reference to asphalt removal operations or mining; however, the tools described herein may be used in applications. In other embodiments, tools according to the present disclosure may be used in a wellbore or other downhole environment used for the exploration or production of natural resources, or in a borehole used for placement of utility lines. Accordingly, the terms “road,” “asphalt,” “wellbore,” “borehole,” and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers’ specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles “a,” “an,” and “the” are intended to mean that there are one or more of the elements in the preceding descriptions. The terms “comprising,” “including,” and “having” are intended to be inclusive and mean that there may be additional elements other than the listed elements. Additionally, it should be understood that references to “one embodiment” or “an embodiment” of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are “about” or “approximately” the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional “means-plus-function” clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words ‘means for’ appear together with an associated function. Each addition, deletion, and modification to the embodiments that falls within the meaning and scope of the claims is to be embraced by the claims.

The terms “approximately,” “about,” and “substantially” as used herein represent an amount close to the stated amount that still performs a desired function or achieves a desired result. For example, the terms “approximately,” “about,” and “substantially” may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to “up” and “down” or “above” or “below” are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A tool for removing material, the tool comprising:

a body having a forward portion and an opposing rear portion, the body having at least one channel extending into the body, at least a portion of the at least one channel being surrounded by the body;

an ultrahard insert including an ultrahard material, the ultrahard insert positioned proximate the forward portion; and a matrix contacting the body and the ultrahard insert, the matrix being mechanically interlocked with the body and at least a portion of the matrix being positioned circumferentially around at least a portion of the forward portion of the body, at least a portion of the matrix being positioned in the at least one channel, wherein the at least one channel is oriented from an outer surface of the forward portion radially inward toward a longitudinal axis of the tool.

2. The tool of claim 1, the ultrahard insert being an apexed ultrahard insert.

3. The tool of claim 1, the matrix including at least one of ultrahard particulates distributed therein or a ceramic material.

4. The tool of claim 1, the ultrahard insert including thermally stable ultrahard material.

5. The tool of claim 1, the at least one channel being oriented relative to the longitudinal axis at an angle in a range of 10° to 90°.

6. The tool of claim 1, the body having at least one recess in an outer surface of the forward portion, the recess being circumferential about the forward portion and at least a portion of the matrix being positioned in the at least one recess.

7. The tool of claim 1, the body including steel.

8. The tool of claim 1, the body including a mechanical connector at the rear portion.

9. A system for removing material, the system comprising:

a degradation tool configured to degrade material; and a plurality of tools selectively connectable to the degradation tool, at least one tool of the plurality of tools including:

a body having a forward portion and an opposing rear portion, the forward portion including a forward face, the body having at least one channel extending into the body;

an ultrahard insert including an ultrahard material, the ultrahard insert positioned proximate the forward portion and in contact with the forward face of the body; and a matrix contacting the body and the ultrahard insert, the matrix being mechanically interlocked with the body and at least a portion of the matrix being connected to the ultrahard insert, wherein at least a portion of the matrix is positioned in the at least one channel, and wherein the at least one channel is oriented from an outer surface of the forward portion radially inward toward a longitudinal axis of the tool.

10. The system of claim 9, the degradation tool being a rotary drum configured to rotate about a rotational axis, and at least a portion of the at least one tool being positioned radially outside of the rotary drum relative to the rotational axis.

11. The system of claim 10, the at least one tool being oriented at an angle between 25° and 120° relative to a radial direction of the rotary drum.

12. The system of claim 10, the at least one tool being selectively connectable to the rotary drum by a mechanical connector at the rear portion of the body.

13. The system of claim 9, the forward portion of the body having one or more mechanical interlocking features, with a portion of the matrix being positioned in the one or more mechanical interlocking features.

14. The system of claim 9, wherein the forward face includes alignment features to align the ultrahard insert with the forward portion.

15. A method of manufacturing a tool, the method comprising:

forming a body with a forward portion including at least one mechanical interlocking feature in the body, and at least one channel, wherein the at least one channel is oriented from an outer surface of the forward portion radially inward toward a longitudinal axis of the tool;

positioning an ultrahard insert in contact with the forward portion of the body;

filling at least a first space in the at least one mechanical interlocking feature in the body and a second space outside the body with a matrix precursor, such that at least a portion of the matrix precursor is positioned in the at least one channel; and curing the matrix precursor at a curing temperature less than 2,200° F. to form a matrix adjacent the ultrahard insert and outside the body.

16. The method of claim 15, further comprising:

inserting the body and ultrahard insert into a mold before filling at least the second space.

17. The method of claim 15, further comprising:

decomposing at least a part of a carbonate binder of the ultrahard insert.

18. The method of claim 15, the matrix precursor including ceramic powder.

* * * * *